United States Patent [19]

Royce

[11] 4,073,307

[45] Feb. 14, 1978

[54] VALVE FOR FIRE HYDRANTS

[75] Inventor: John H. Royce, Traverse City, Mich.

[73] Assignee: Traverse City Iron Works, Traverse City, Mich.

[21] Appl. No.: 710,235

[22] Filed: July 30, 1976

[51] Int. Cl.² ............................................. F16K 25/00
[52] U.S. Cl. ................................ 137/283; 29/157.1 R; 29/40.1 F; 29/450; 137/315; 251/175; 251/333
[58] Field of Search ......... 137/283, 284, 307, DIG. 3, 137/516.25, 516.27, 516.29; 251/175, 210, 332, 333, 334, 360, 362, 363, 365

[56] References Cited

U.S. PATENT DOCUMENTS

| | | | |
|---|---|---|---|
| 577,519 | 2/1897 | Pichler | 137/283 |
| 645,223 | 3/1900 | Bashline | 251/362 X |
| 1,061,556 | 5/1913 | Osborne | 251/210 X |
| 1,278,487 | 9/1918 | Lofton | 137/283 |
| 1,616,742 | 2/1927 | Derby | 251/360 X |
| 1,847,385 | 3/1932 | Dengler | 251/334 |
| 2,213,998 | 9/1940 | Sifkovitz | 251/210 X |
| 2,262,489 | 11/1941 | Bolser | 137/301 X |
| 2,980,125 | 4/1961 | Grant et al. | 137/283 X |
| 3,027,907 | 4/1962 | Lee | 137/516.29 X |
| 3,054,422 | 9/1962 | Napolitano | 137/509 |
| 3,075,547 | 1/1963 | Scaramucci | 137/516.29 |
| 3,219,311 | 11/1965 | Siver | 251/86 |
| 3,356,104 | 12/1967 | Canalizo | 137/516.29 |
| 3,980,097 | 9/1976 | Ellis | 137/283 |

Primary Examiner—Martin P. Schwadron
Assistant Examiner—Richard Gerard
Attorney, Agent, or Firm—Price, Heneveld, Huizenga & Cooper

[57] ABSTRACT

The specification discloses a fire hydrant and valve assembly therefor including a flexible, resilient compressible, fluid-impervious sealing flange or lip formed on and extending outwardly of the main valve sealing member for supplemental sealing of both the water passageway through the main valve seat ring and between the valve seat ring and inner surface of the hydrant conduit.

Also disclosed is a method for assembling a valve assembly in a fire hydrant to prevent damage to the valve assembly by using the sealing flange or lip on the sealing member to locate and guide the valve assembly through the valve seat area of the conduit as well as to lubricate that area during insertion of the valve to ease assembly and facilitate later disassembly.

19 Claims, 7 Drawing Figures

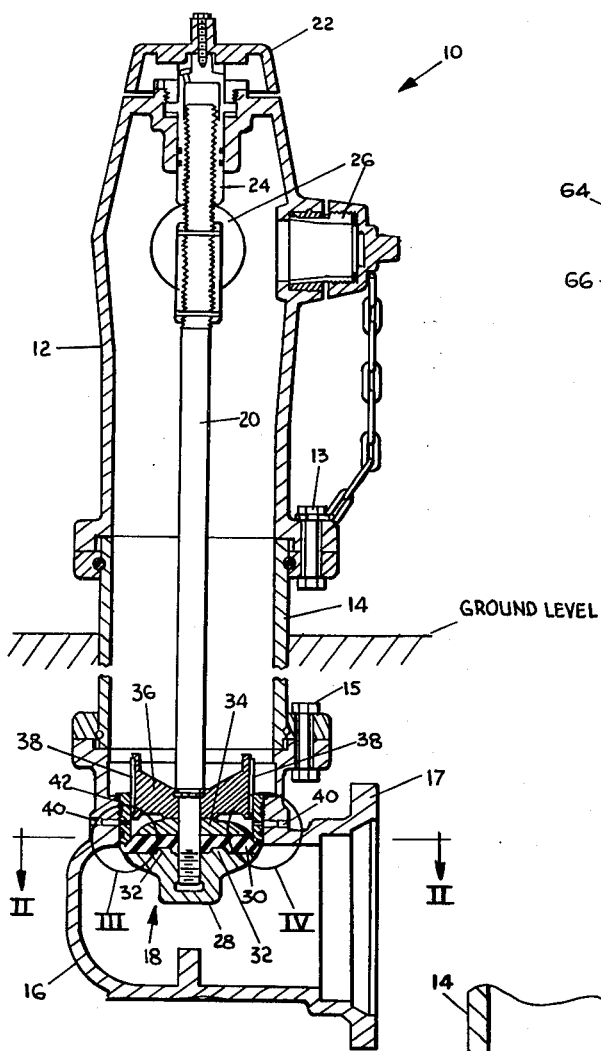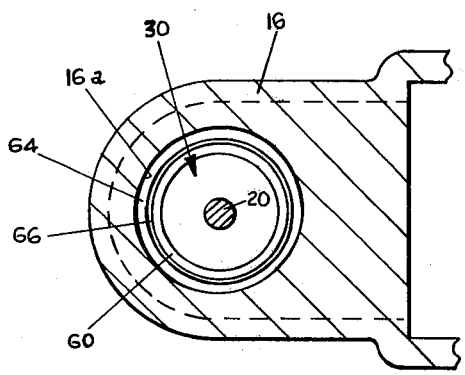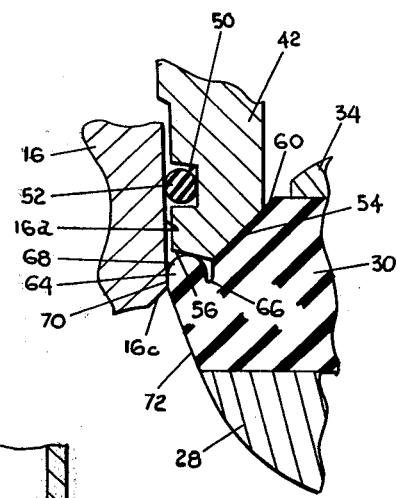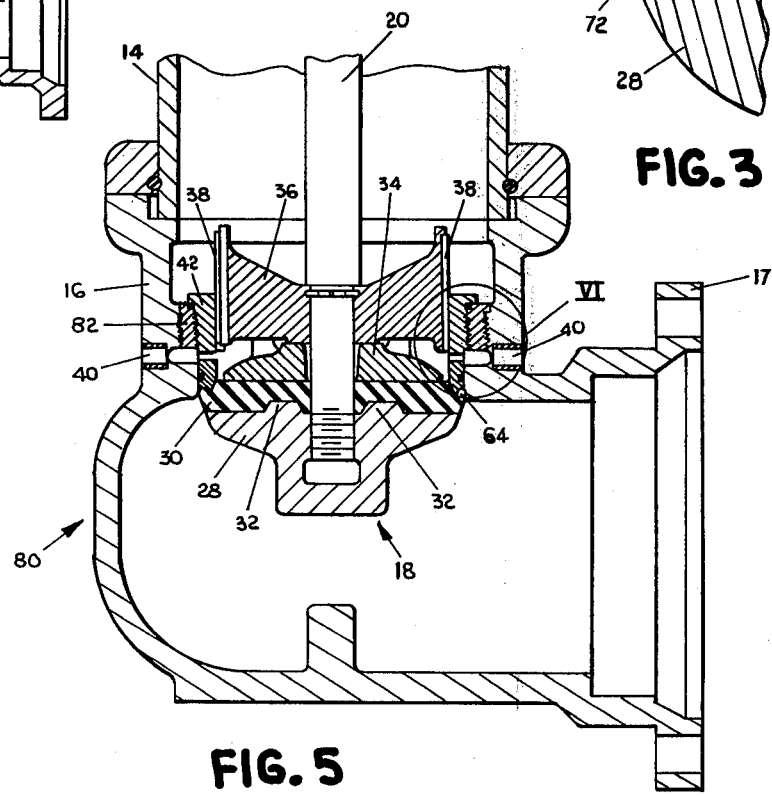
FIG. 1
FIG. 2
FIG. 3
FIG. 5

VALVE FOR FIRE HYDRANTS

BACKGROUND OF THE INVENTION

This invention relates to fire hydrants and, more particularly, to a valve assembly for the main valve of a fire hydrant which provides a supplemental seal for the main valve as well as a means for assembling a fire hydrant without damage to the valve apparatus.

Conventional fire hydrants typically include an elongated circuit having nozzle outlets thereon and projecting from the ground in which is mounted an elongated rod for operating a main valve to close off water from a supply line well below ground level. The main valve typically includes a sealing member bearing against a brass valve seat ring or other member threadedly secured within the barrel of the hydrant below ground level. A common and reoccurring problem with conventional hydrant structures is the failure of the sealing member and/or seat member from age, deterioration or the like necessitating replacement of the sealing member. In order to replace the member, it is necessary to unscrew the valve seat ring which in many cases has become corroded and extremely difficult to remove. Such corrosion results from exposure to water from normal hydrant usage and/or any leakage of water past conventional sealing points between the inside of the conduit of the hydrant and the valve seat ring.

Not only can water leak past the seal between the valve seat ring and conduit to cause corrosion of the valve seat ring as mentioned above, but failure or deterioration of either this seal or the main seal of the main sealing member against the valve seat ring causes the hydrant to fill with water above ground level. When this occurs in winter or freezing conditions, fracture or other damage to the hydrant could result. Consequently, both of the above-mentioned seals in a conventional fire hydrant must function to prevent such leakage and damage.

For replacement of the conventional seals as mentioned above, it is necessary that the hydrant be disassembled and then reassembled when in place in the ground. Because the valve seat ring is typically threaded into position and because the main sealing member must pass through a narrow, threaded portion of the hydrant conduit to allow the seat to be threaded into place, damage can occur to parts of the main valve when lowering the valve assembly into positon below ground level from above. Such damage can include galling or peeling of the sealing O-rings on the valve seat rings, stripping or gouging of the threads in the cast iron barrel or on the brass seat ring, and/or difficulty in obtaining proper seating of the sealing O-rings.

The present valve assembly provides a supplemental seal which cooperates with the other seals to ensure against and provide a solution for the above sealing problems as well as providing a means for guiding and facilitating the reassembly of a hydrant when replacement of the seals or other maintenance is necessary.

SUMMARY OF THE INVENTION

The present invention is a fire hydrant and valve apparatus especially adapted for use in fire hydrants including a supplemental seal which both completely closes the hydrant from passage of water therethrough as well as closing or sealing off the valve seat ring or other valve seat apparatus from the water supply to reduce and/or prevent corrosion thereof. The supplementary fluid seal is included on a valve within the hydrant water conduit. The valve opens and closes the conduit to or from a supply of water provided from a connection means to the conduit. The valve includes a valve seat member which, in the preferred embodiment, is an annular, externally threaded ring, with a fluid passage therethrough secured within an inner surface portion of the conduit. First sealing means are provided for preventing fluid flow between the valve seat member and the inner conduit surface as well as second sealing means for closing the fluid passageway of the valve seat member. The supplementary fluid seal is a third sealing means on the second sealing means for engaging both the valve seat member and the inner conduit surface to close the valve seat passageway as well as seal off fluid from the valve seat.

In the preferred embodiment, the second sealing means is a generally flat or disc-like flexible, resilient, compressible, fluid-impervious member typically formed from Nordel rubber including a beveled or chamfered upper edge engaging a similarly chamfered lower edge of the valve seat member. The third sealing means includes an annular flange or lip formed in one piece with the disc-like second sealing means from the flexible, resilient, compressible and fluid-impervious material. The flange or lip extends outwardly from the periphery of the second sealing means, defines an area substantially matched to the inner sealing surface of the conduit and is engaged against the inner conduit sealing surface and the valve seat member when the second sealing means is closed to accomplish the abovementioned sealing functions.

The invention also includes a method for assembling a fire hydrant for protecting valve portions thereof including the steps of inserting a main valve assembly into the conduit of a hydrant with a sealing disc or member on the main valve assembly being passed through an open end of the barrel ahead of the valve seat member on the main valve assembly. The method includes guiding the main valve assembly through the reduced diameter valve seating area of the conduit with the flexible, resilient, compressible flange on the sealing disc which provides the supplemental fluid seal mentioned above when closed. The flange locates and centers the main valve assembly to prevent damage to the other sealing means or valve seal during such assembly. The method also includes applying a lubricant to the valve seat area with the flange or lip during assembly.

The present invention provides significant advantages over prior known hydrants and valve assemblies for hydrants. The third sealing means provides a supplemental fluid seal protecting against failure of any of the conventional sealing points typically included in the main valve area of a fire hydrant. The third sealing means, therefore, prolongs the life of the valve assembly reducing the frequency of service required for the hydrant. Location of the third sealing means ahead of the valve seat area and virtually all parts which might become corroded in the valve assembly also prolongs the life of the valve by preventing water from corroding those parts during the long service period typically required for a hydrant. Moreover, the supplemental fluid seal simultaneously provides a dual sealing function unlike previous hydrant valves, namely, closing off the water supply to the barrel of the hydrant and sealing off the valve seat area to protect the valve seat ring and its connection to the barrel.

The supplemental fluid seal also provides advantages in the method of assembly of the hydrant. When the main valve assembly is lowered into the hydrant barrel for reassembly, the annular, supplementary sealing flange guides the valve apparatus into position and through the narrowed or constricted portion of the barrel to prevent damage to the valve apparatus. Use of the lip flange or supplemental seal to apply lubricant during such assembly also eases the compression of the other sealing rings normally used in the valve assembly and facilitates their proper seating.

These and other objects, advantages, purposes and features of the invention will become more apparent from a study of the following description taken in conjunction with the drawings.

BRIEF DESCRIPTION OF THE DRAWINGS

FIG. 1 is a sectional elevation of a fire hydrant and valve apparatus embodying the present invention;

FIG. 2 is a fragmentary, sectional plan view taken along the top surface of the main valve sealing disc and plane II—II of FIG. 1;

FIG. 3 is an enlarged, fragmentary view of area III of FIG. 1 illustrating the sealing member including the supplemental fluid seal of the present invention in closed position;

FIG. 5 is a fragmentary sectional view of a second embodiment of the fire hydrant and valve apparatus therefor including the present invention;

DESCRIPTION OF THE PREFERRED EMBODIMENT

Figure 6:
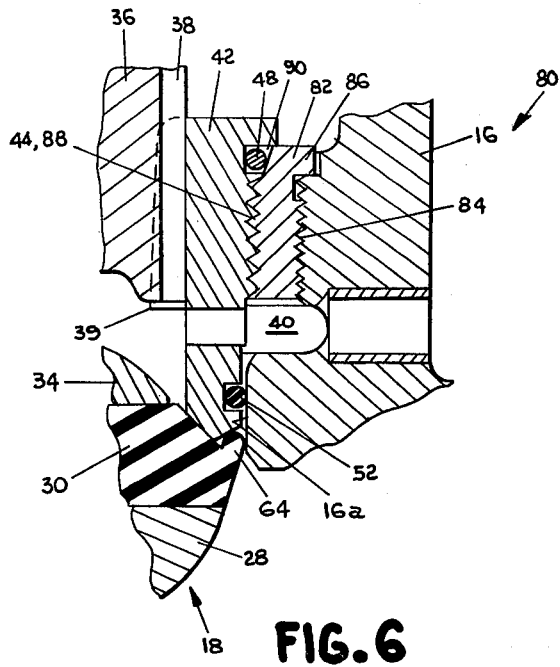
FIG. 6 is an enlarged, fragmentary sectional view of area VI of FIG. 5.
Figure 7:
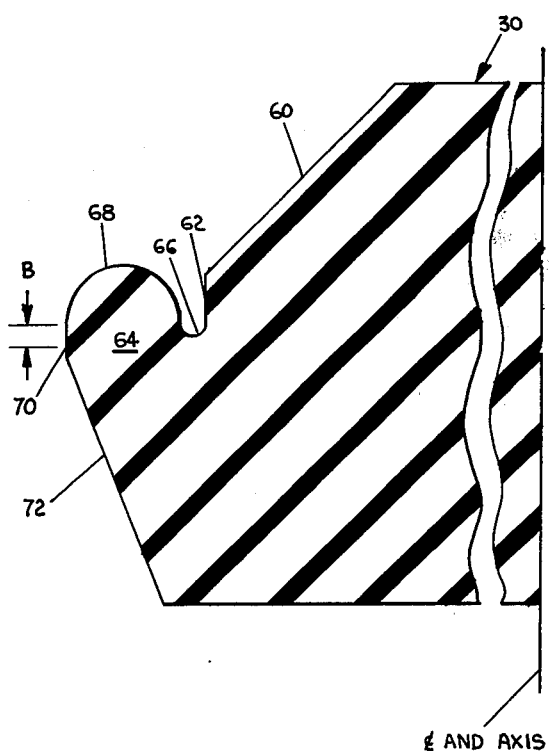
FIG. 7 is an enlarged, fragmentary, broken view of the main valve sealing disc including the supplemental fluid seal flange or lip.

Referring now to the drawings in greater detail, FIG. 1 illustrates a fire hydrant 10 including the present invention. Hydrant 10 is an elongated conduit including a head 12 seated on and bolted with bolts 13 to a generally cylindrical barrel 14 which projects into the ground and extends to a distance below the frost level in the ground for the area or region in which the hydrant is used. Seated on and bolted to the lower end of barrel 14 with bolts 15 is a lower barrel or base 16 which extends first downwardly parallel and coaxial with the barrel 14 and then extends at right angles to barrel 14 and includes a flange 17 for connection to a water line for supplying water pressure to the hydrant.

Within the lower barrel section 16 is positioned a main valve assembly 18 for opening and closing barrel 14, 16 to allow water to flow to the head 12 of the hydrant. Valve assembly 18 is mounted on the lower end of a control rod or stem 20 which in turn is moved axially by operating nut 22 via a threaded connection 24 within the upper end of the head 12. Rotation of the operating nut 22 in one direction lowers main valve assembly 18 away from its valve seat allowing water to flow to head 12 and outwardly to fire hoses which may be connected at nozzles 26. Rotation of the operating nut 22 in the opposite direction draws valve assembly 18 upwardly closing off the passageway through the barrel and thus the water supply to the head 12 and nozzles 26.

Figure 4:
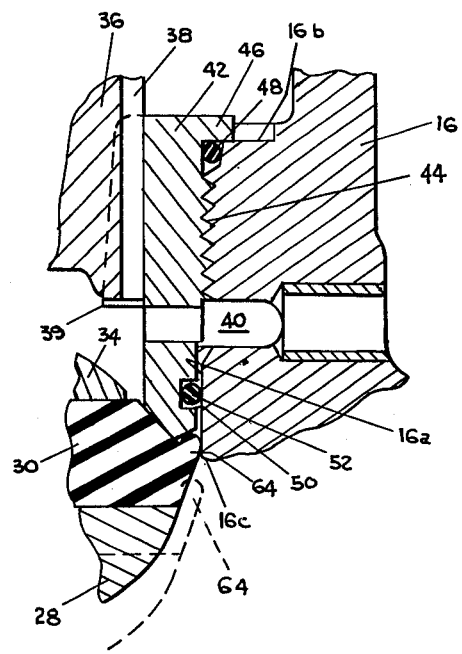
FIG. 4 is an enlarged fragmentary view of area IV of FIG. 1 illustrating the sealing member, valve seat ring, and supplemental seal as well as the O-ring sealing members for the valve seat ring.

As is best seen in FIGS. 2–4, the essence of the invention lies in the sealing arrangement and assembly method of the main valve apparatus 18. Main valve 18 includes a lower washer 28 having a central threaded bore for threadedly securing the washer to the lower end of control rod 20. Immediately above, telescoped over rod 20, and in engagement with washer 28 is a sealing disc 30 including at least a pair of recesses in its lower surface receiving projections 32 extending upwardly from washer 28 to locate and prevent rotational movement of the sealing member with respect to the washer. Immediately above and also telescoped over rod 20 are an upper washer 34 and a bronze drain valve 36.

Drain valve 36 is vertically retained in place on rod 20 by a cotter key or the like and includes vertically extending apertures therethrough and sealing members 38. The faces of sealing members 38 slide over, cover and seal the openings to drain passageways 40 when the rod 20 and valve apparatus 18 is raised and lowered to open the main valve. The sealing faces of drain valve 36 are located and prevented from rotation by pairs of spaced projections 39 extending radially inwardly from the inside surface of valve seat ring 42 as shown in FIG. 4. Hence, any water left in the head or barrel of the hydrant flows downwardly through drain valve 36 when main valve 18 is in its up and closed position and outwardly through passages 40 on either side of the hydrant. This removes any water from the barrel or head of the hydrant which could freeze and damage the hydrant in cold weather or rust and corrode the interior of the hydrant.

As is best seen in FIGS. 3 and 4, the sealing function of main valve assembly 18 and especially the sealing member 30 takes place in cooperation with valve seat ring 42 and the valve seat area comprising a narrowed surface or constricted passageway 16a within the conduit or barrel 16 of the hydrant. Valve seat ring 42 is preferably formed from brass to retard corrosion and is generally a cylindrical ring which is externally threaded at 44 immediately below a radially extending annular flange 46 forming a right angle corner for receipt of a sealing O-ring 48 as shown in FIG. 4. Immediately below radially extending apertures in the lower portion of ring 42 which form a portion of the drain passageways 40 is an annular recess 50 on the external side of the ring. An annular O-ring 52 is seated in recess 50 for additional sealing between the valve seat ring and surface 16a. The lower edge of the seat ring 42 includes an annular, interior, beveled surface 54 generally facing inwardly and downwardly and an external, beveled, annular surface 56 generally facing outwardly and downwardly. When threaded into position with flange 46 seated against surface 16b of barrel 16 and threads 44 engaging the threaded portion of the constricted or narrowed area of barrel 16, flexible, resilient fluid-impervious annular O-rings 48, 52 prevent water flow past the valve seat ring between the seat ring and the narrow sides.

As is best seen in FIGS. 2–4 and 7, sealing member or disc 30 is generally a flat, disc-like member having planar upper and lower surfaces and formed from resilient, flexible, compressible, fluid-impervious material such as Nordel rubber. The upper, outer edge portion 60 is beveled to provide an annular surface which engages surface 54 of seat ring 42 when valve assembly 18 is closed. On the outer circumferential edge or periphery 62 of disc 30 is integrally formed in one piece the supplemental sealing flange or lip 64 separated from the periphery 62 by an annular groove or recess 66. Flexible, resilient lip 64 includes a rounded surface 68 extending in the axial direction toward the side of the disc on which the beveled surface 60 is located. A flat, annular surface 70 having a width "B" shown in FIG. 7 and lying in a plane parallel to the central axis of the disc is formed on the circumference of the disc. The outer edge of the disc 30 tapers upwardly and outwardly along surface 72 to merge with the annular flat circumferential surface 70 below flange 64 to provide support and strength for the flexible lip on disc 30.

As will be best seen in FIG. 4, in its free and uncompressed state, lip flange 64 on disc 30 has an outside diameter on circumferential surface 70 designed to substantially match and be equivalent to the inside diameter of valve seat area 16a of barrel or conduit 16. In operation, when sealing disc 30 is drawn upwardly by rod 20, beveled surface 60 engages correspondingly beveled surface 54 of valve seat 42 to provide a main seal against passage of water through valve seat ring 42. Supplemental sealing functions are also provided when disc 30 is closed, namely, contact of the rounded, axially extending surface of flange 64 with the other beveled surface 56 of seat 42 and simultaneous contact of circumferential surface 70 with surface 16a of barrel or conduit 16. As sealing member 30 is drawn upwardly, the outward angle of beveled surface 56 helps force lip 64 against surface 16a. Water is thus prevented by lip 64 from passing either interior or exterior to valve seat ring 42. Water pressure entering from connection 17 against the main valve helps to increase the sealing effect of the lip flange 64 by pushing against surface 72 and the lip flange itself to tightly engage surfaces 68 and 70 with surfaces 56, 16a respectively. Annular groove 66 allows the lip 64 to flex while the resiliency of the fluid-impervious sealing material helps urge the lip into sealing engagement.

This flexibility also allows proper seating of the sealing disc upon closing of the valve as shown in FIG. 4. Should the lip 64 be extended outwardly beyond the surface 16a by water pressure, slight oversize, or the like, the rounded lip will contact the beveled or chamfered surface 16c (FIGS. 3 and 4) on the bottom of the narrowed or constricted area 16a of barrel 16 to compress the lip inwardly so that it will slide upwardly along the axially extending wall surface 16a into position against surface 56 and wall surface 16a. Accordingly, flange 64 not only prevents water from passing through the internal passageway of valve seat ring 42 as a supplement to the sealing contact between beveled surface 60 and surface 54 of ring 42, but also seals off any fluid or water passage between valve seat ring 42 and the inside surface of the barrel or conduit 16. Since lip 64 is upstream of the entire ring 42, corrosion of that ring is reduced and/or prevented when lip 64 is in its closed position.

As shown in FIGS. 5 and 6, the main valve assembly 18 may also be used in a slightly varying embodiment 80 of the hydrant which is designed for further protection against corrosion and to ease later maintenance and disassembly of the hydrant. In embodiment 80, a second valve seat ring 82 is utilized intermediate the inside surface of barrel or conduit 16 and the main valve seat ring 42. Ring 82 is also formed from brass and is designed to be permanently installed in the hydrant conduit with its externally threaded portion 84 engaging threads on the inside of the conduit and its flange 86 seating against an annular shoulder of the conduit. The inside surface of the cylindrical ring 82 is also threaded at 88 to receive the threads 44 of the externally threaded main valve seat ring 42. In the case of embodiment 80, O-ring 52 bears against the same surface 16a of barrel or conduit 16 as in embodiment 10 while O-ring 48 on main valve seat ring 42 bears against a beveled surface 90 immediately above threads 88 on intermediate ring 82. The remaining portions of embodiment 80 are exactly similar to those described above for embodiment 10. The intermediate ring 82 provides brass-to-brass contact allowing easier removal of main valve seat ring 42 for later service of the hydrant and/or replacement of the disc 30.

As will now be understood from the drawings, should replacement of the sealing member 30 be necessary after the hydrant has been in use for a long service period, line water pressure must be shut off to enable disassembly and removal. Head 12 is unbolted and removed from barrel 14 and a large annular wrench is dropped over the control rod 20 and engaged in specially provided lugs on the valve seat ring 42. Rotation of the wrench unscrews valve seat 42 enabling the entire valve assembly 18 to be lifted out of barrel sections 14, 16 to be worked on at ground level. The sealing member 30 is replaced by removing the cotter key holding drain valve 36 in place and slipping drain valve 36, upper washer 34 and the sealing disc off the upper end of the rod 20. Thereafter, these parts including a new valve sealing member 30 are reassembled on the rod 20 in reverse order and the cotter pin made fast.

With the supplemental sealing lip flange 64 present on the valve sealing member 30 as described above, reassembly of the main valve apparatus 18 in the barrel of the hydrant is now possible without damaging O-rings 48, 52 or external threads 44 of the valve seat ring. The entire assembly is dropped down into barrel 14 with the peripheral circumference 70 of lip flange 64 first contacting the upper threaded portion of surface 16a or barrel 16 or threads 88 on the internal surface of intermediate sealing ring 82. Such contact with lip flange 64 centers and locates the valve assembly 18 within the threaded portion and guides the assembly through the constricted narrow portion of the barrel until the external threads 44 of valve seat ring 42 contact the threaded portion of the barrel 16 or ring 82. The wrench engaging ring 42 is then rotated to secure ring 42 in place. Such guidance through the constricted or narrow portion prevents galling, peeling or other damage to the O-rings 48, 52 or damage to the soft brass threads 44 on ring 42 as they are positioned.

In addition, the method also enables easier compression and seating of O-ring 52 against surface 16a if a lubricant such as grease is applied to the outer surface 70 of flange 64 prior to the above-described reassembly. With the application of such a lubricant, lowering of the valve assembly with flange 64 through the constricted or narrow portion of the barrel applies or coats the lubricant or grease along the threaded portion of the barrel and surface 16a such that when the O-ring 52 contacts that coated surface, the O-ring will slide easily into its seated and compressed position in recess 50. The application of such lubricant to the threads also enables easier securement of the valve seat ring and facilitaties removal of the ring by helping to prevent corrosion of the ring to the barrel or to intermediate ring 82 should later service be necessary.

The sealing member 30 including supplemental sealing lip flange 64 has been tested in a hydrant with conventional O-rings 48 and 52 removed from the assembly. Water pressures of between 50 and 400 psi were applied from below the main valve, i.e., from the direction of connection 17, and it was found that no water leakage past ring 42, either externally or internally, occurred. In conventional designs, removal of an O-ring between the valve seat ring 42 and the barrel would allow the head of the hydrant to fill with water causing the damage mentioned above.

Accordingly, the present invention provides significant sealing advantages over conventional hydrant designs as well as an improved method for assembling hydrants after service or repair. The method prevents damage to the valve seat members and sealing rings to enable longer periods between servicing.

While several forms of the invention have been shown and described, other forms will not be apparent to those skilled in the art. Therefore, it will be understood that the embodiments shown in the drawings and described above are merely for illustrative purposes and are not intended to limit the scope of the invention which is defined by claims which follow.

The embodiments of the invention in which an exclusive property or privilege is claimed are defined as follows.

1. A fire hydrant comprising:
a water conduit;
connection means for connecting said conduit to a water supply; and
valve means within said conduit for opening and closing said conduit to or from the supply of water; said valve means including a valve seat member with a fluid passage therethrough secured within an inner surface portion of said conduit, first sealing means for preventing fluid flow between said valve seat member and inner conduit surface, and second sealing means for closing said fluid passageway of said valve seat member; said second sealing means including thereon third sealing means for engaging both said valve seat member and inner conduit surface to provide a supplementary fluid seal which completely closes said conduit and seals off said valve seat member from said water supply.

2. The hydrant of claim 1 wherein said third sealing means is positioned upstream of said first and second sealing means and said valve seat member on the side of said valve seat member closest to said connection means to protect said valve seat and its securement to said conduit from corrosion.

3. The hydrant of claim 1 wherein said third sealing means is flexible, resilient, compressible, and formed from fluid-impervious material, extends outwardly from said second sealing means, and defines an area larger than said second sealing means but substantially matched to said inner surface of said conduit whereby assembly of said hydrant with said third sealing means guides said valve means into said conduit and protects first sealing means from damage.

4. The hydrant of claim 3 wherein said second sealing means is a generally flat, flexible, resilient, compressible, fluid-impervious member engaging one surface of said valve seat member; said third sealing means including a flange formed in one piece with said second sealing member, extending outwardly from the outer edge of said second sealing member, and engaging a second surface of said valve seat member and said inner conduit surface.

5. The hydrant of claim 4 wherein said second sealing member is a solid disc having an annular beveled edge and a central axis generally transverse to the plane of said disc; said valve seat member including an annular ring; said one surface of said valve seat ring being an annular, inner, beveled surface and engaged by the beveled edge of said disc; said second surface of said valve seat ring being annular and merging with said one surface thereof; said third sealing flange including an annular, circumferential lip having a rounded edge extending in the direction of said axis and engaging said second valve seat surface, an outer circumferential surface engaging said inner conduit surface, and an annular groove separating at least a portion of said lip from said outer edge of said member.

6. The hydrant of claim 5 wherein said outer circumferential surface of said annular lip is parallel to the central axis of said disc.

7. The hydrant of claim 5 wherein said disc is mounted on a rod between a pair of restraining washers contacting the upper and lower surfaces of said disc for holding said disc in position on said rod; and means for moving said rod with said washers and disc thereon toward and away from said valve seat ring and inner conduit surface to open and close said valve means.

8. The hydrant of claim 1 wherein said first sealing means in an annular, flexible, resilient, compressible, fluid-impervious sealing ring; said second sealing means including a circular disc formed from flexible, resilient, compressible, fluid-impervious material; said third sealing means including an annular flange on the circumferential edge of said disc extending outwardly thereof.

9. The hydrant of claim 1 wherein said second sealing means is a circular disc formed from flexible, resilient, compressible, fluid-impervious material; said third sealing means including an annular flange on the circumferential edge of said disc extending outwardly thereof, said flange being formed in one piece with said disc being at least partially separated from said disc edge by an annular groove facilitating flexure of said flange, said disc edge also tapering outwardly and merging with said flange on the side of said flange opposite said groove for strengthening and supporting said flange.

10. The hydrant of claim 1 wherein said inner conduit surface is threaded and said valve seat member is an annular ring threaded externally and threadedly secured to said threaded inner conduit surface; fourth sealing means for sealing fluid flow between said annular valve seat ring and inner conduit surface.

11. The hydrant of claim 10 wherein said first and fourth sealing means each include an annular, flexible, resilient, compressible O-ring, said O-rings being positioned at locations spaced from one another between said annular valve seat ring and inner conduit surface.

12. The hydrant of claim 1 including a second valve seat member intermediate said first-mentioned valve seat member and said inner conduit surface; said first valve seat member being threaded to said second valve seat member which, in turn, is threaded to said inner conduit surface; fourth sealing means for sealing fluid flow between said first and second valve seat members.

13. A valve apparatus for fire hydrants or the like comprising a valve seat adapted for securement within a water conduit of a hydrant, said valve seat having a water passageway therethrough; valve means for closing said valve seat water passageway including first sealing means for preventing water flow between said valve seat and the water conduit of a hydrant, second sealing means separate from said first sealing means for opening and closing said passageway of said valve seat, means for moving said second sealing means between open and closed positions, and third sealing means on said second sealing means for engaging both said valve seat at a location spaced from said first and second sealing means and the water conduit of a hydrant also at a location spaced from said first and second sealing means to prevent water flow through said valve seat passageway and between the valve seat and the water conduit of a hydrant when said second sealing means is closed as a supplement to said first and second sealing means.

14. The valve apparatus of claim 13 wherein water flows through said valve seat passageway in a predetermined direction when said second sealing means is open; said third sealing means being positioned upstream of said first and second sealing means and said valve seat to protect said valve seat and its securement to the conduit of a hydrant from corrosion.

15. The valve apparatus of claim 13 wherein said apparatus is adapted for securement within a hydrant conduit of a predetermined cross-sectional area; said third sealing means being formed from a material which is flexible, resilient, compressible and fluid-impervious, extends outwardly from said second sealing means, and defines an area larger than said second sealing means and substantially matched to the predetermined area of the conduit within which the apparatus is adapted to be secured whereby assembly of a hydrant with said third sealing means guides said apparatus into the hydrant conduit and protects said first sealing means and valve seat from damage.

16. The valve apparatus of claim 15 wherein said second sealing means includes a circular disc formed from flexible, resilient, compressible, fluid-impervious material; said third sealing means including an annular flange on the circumferential edge of said disc extending outwardly thereof.

17. The valve apparatus of claim 16 wherein said annular flange is formed in one piece with said disc from said flexible, resilient, compressible, fluid-impervious material and is at least partially separated from said disc edge by an annular groove facilitating flexure of said flange, said disc edge also tapering outwardly and merging with said flange on the side of said flange opposite said groove for strengthening and supporting said flange.

18. The valve apparatus of claim 17 wherein said annular flange is a lip having a rounded edge adjacent said groove for engagement with said valve seat when said disc is in its closed position, and an outer circumferential surface for engagement with the surface of a hydrant conduit when said disc is in its closed position.

19. The valve apparatus of claim 18 wherein said outer circumferential surface of said lip is parallel to an axis extending through the radial center of said disc.

* * * * *

UNITED STATES PATENT AND TRADEMARK OFFICE
CERTIFICATE OF CORRECTION

PATENT NO. : 4,073,307
DATED : February 14, 1978
INVENTOR(S) : JOHN H. ROYCE

It is certified that error appears in the above-identified patent and that said Letters Patent are hereby corrected as shown below:

Column 1, Line 11:

"circuit" should be --conduit--.

Column 2, Line 24:

After "the" please insert --same--.

Column 2, Line 47:

"seal" should be --seat--.

Column 6, Line 40:

"or" should be --of--.

Column 6, Line 65:

"facilitaties" should be --facilitates--.

Column 7, Line 19:

"not" should be --now--.

Column 7, Line 24:

After "by" insert --the--.

UNITED STATES PATENT AND TRADEMARK OFFICE
CERTIFICATE OF CORRECTION

PATENT NO. : 4,073,307
DATED : February 14, 1978
INVENTOR(S) : JOHN H. ROYCE

It is certified that error appears in the above–identified patent and that said Letters Patent are hereby corrected as shown below:

Column 7, Line 60:

After "protects" please insert --said--.

Column 8, Line 29:

"in" should be --is--.

Signed and Sealed this

Third Day of October 1978

[SEAL]

Attest:

RUTH C. MASON
Attesting Officer

DONALD W. BANNER
Commissioner of Patents and Trademarks